United States Patent [19]

Sutoh et al.

[11] 4,408,660

[45] Oct. 11, 1983

[54] VEHICLE HUMIDITY CONTROL APPARATUS FOR PREVENTING FOGGING OF WINDOWS

[75] Inventors: Shinji Sutoh, Konan; Toshizo Hara, Higashi Matsuyama; Takeshi Harada, Higashi Matsuyama; Masahiro Eda, Higashi Matsuyama, all of Japan

[73] Assignee: Diesel Kiki Company, Ltd., Tokyo, Japan

[21] Appl. No.: 198,429

[22] Filed: Oct. 20, 1980

[30] Foreign Application Priority Data

Oct. 20, 1979 [JP] Japan .................................. 54-135535

[51] Int. Cl.³ .................. F24F 3/14; G05D 23/00; B61D 27/00
[52] U.S. Cl. .................................. 165/21; 165/42; 236/44 A; 236/91 C; 236/49; 62/176.2; 62/176.6
[58] Field of Search .................. 165/17, 21, 41–43; 236/44 R, 44 A, 44 C, 49, 91 C; 62/176 R, 176 A, 176 E, 128; 98/2.01, 2.08, 2.09, 2.11, 90, 92; 52/171; 219/203

[56] References Cited

U.S. PATENT DOCUMENTS

| 1,751,806 | 3/1930 | Fleisher | 236/44 C |
| 3,332,620 | 7/1967 | Streed | 236/44 A |
| 3,580,501 | 5/1971 | Streed | 236/91 C |
| 4,136,822 | 1/1979 | Felter | 236/49 |
| 4,196,338 | 4/1980 | Edel | 52/171 |

*Primary Examiner*—Henry C. Yuen
*Assistant Examiner*—Harry Tanner
*Attorney, Agent, or Firm*—David G. Alexander

[57] ABSTRACT

A sensor (27) is provided to sense the humidity at the inner surface of a window of a vehicle interior. When the sensed surface humidity is above a certain value, the possibility of the window being fogged arises and the proportion of outside air to recirculated air is increased to 100% to reduce the interior humidity. When the surface humidity is above a higher value, the interior air control system (5) is operated to reduce the interior humidity by increasing the amount of inlet air, the inlet air temperature, etc.

5 Claims, 4 Drawing Figures

VEHICLE HUMIDITY CONTROL APPARATUS FOR PREVENTING FOGGING OF WINDOWS

The present invention relates to a vehicle humidity control apparatus comprising means for preventing the fogging or dimming of vehicle windows due to condensation of moisture on the window inner surfaces. Such fogging impairs the visibility of the vehicle operator and creates a potentially dangerous situation.

In the art developed thus far, the operator must manually control the various components of an interior air control system such as a heater, blower, cooler, defroster and the like to eliminate the fogging as it starts to occur. Such manual operation detracts from the ability of the operator to concentrate on road conditions which further invites the possibility of a tragic accident. When it starts to rain, the interior humidity increases and together therewith the tendency of the windows to fog. Such a condition is especially disadvantageous since the visibility is already reduced by the rain and the operator must control the windshield wipers along with taking measures to prevent fogging of the windows while continuing to drive the vehicle.

It has become popular recently to provide humidifiers in vehicles to prevent dehydration of the occupants and subsequent discomfort. However, when the windows begin to fog, the operator is confronted with yet another manual operation of turning off the humidifier. In summary, all of these manual operations for coping with rain and fogging of the vehicle windows are a nuisance and a potential safety hazzard.

SUMMARY OF THE INVENTION

It is an object of the present invention to provide a humidity control apparatus for a vehicle interior comprising means for automatically controlling the interior humidity in such a manner as to prevent fogging of the vehicle windows due to condensation of moisture thereon caused by excess humidity and temperature differentials.

A vehicle interior humidity control apparatus embodying the present invention includes window inner surface humidity sensor means for sensing a window inner surface humidity and interior air control means, and is characterized by comprising system control means responsive to the humidity sensor means for controlling the air control means in such a manner that when the humidity rises above a predetermined humidity value the air control means increases a proportion of outside air an inlet air to a maximum value.

In accordance with the present invention, a sensor is provided to sense the humidity at the inner surface of a window of a vehicle interior. When the sensed surface humidity is above a certain value, the possibility of the window being fogged arises and the proportion of outside air to recirculated air is increased to 100% to reduce the interior humidity. When the surface humidity is above a higher value, the interior air control system is operated to reduce the interior humidity by increasing the amount of inlet air, the inlet air temperature, etc.

It is another object of the present invention to provide a generally improved vehicle humidity control apparatus.

Other objects, together with the foregoing, are attained in the embodiments described in the following description and illustrated in the accompanying drawing.

DESCRIPTION OF THE PREFERRED EMBODIMENTS

While the vehicle humidity control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
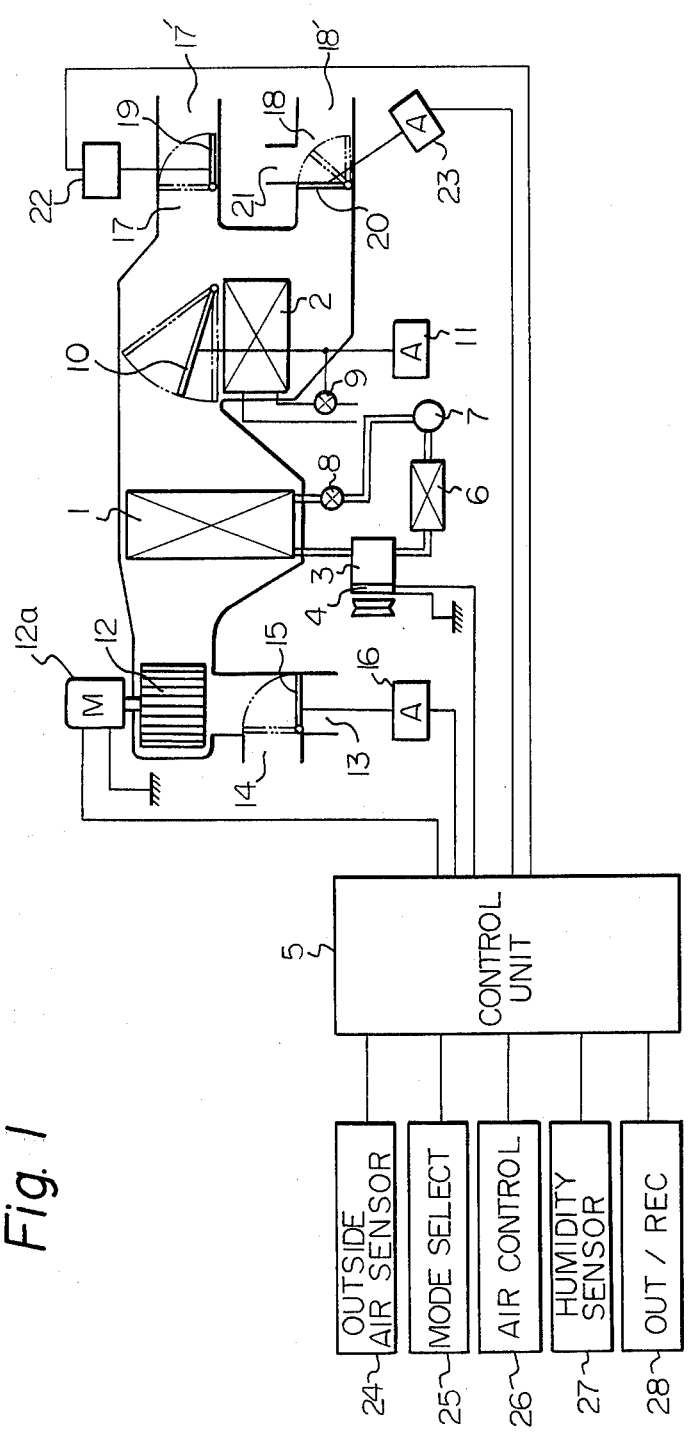
FIG. 1 schematically shows an automotive air conditioning system to which the present invention is applied.

Referring to FIG. 1, there is shown an automotive air conditioning system of the so-called air mix type. The air conditioning system includes an evaporator 1 and a heater core 2 located in the system downstream of the evaporator 1. The evaporator 1 is adapted to cool air coming into the system and forms a closed loop fluid circuit together with a compressor 3, condenser 6, liquid receiver 7 and expansion valve 8. The evaporator 1 is driven by an electromagnetic clutch 4 which is in turn coupled and uncoupled by outputs of a control circuit or unit 5.

Adapted to heat incoming air, the heater core 2 is supplied with a controlled volume of hot engine coolant through a water cock 9 which is opened and closed also by the control circuit 5. In the illustrated embodiment, an actuator 11 associated with an air mix door 10 bifunctions to control the position of the water cock 9.

As shown, the air mix door 10 is positioned on the upstream side of the heater core 2 such that it suitably proportions the cooled and heated air and thereby the temperature of the inlet air in accordance with its angular position. The actuator 11 is controlled by an output of a temperature control device (not shown) to vary the angular position of the air mix door 10. Any desired type of actuator 11 is usable such as one operated by vacuum or electromagnetic force. A blower 12 sucks outside air or recirculated air through an inlet 13 or 14 selected by an outside air/recirculated air selector door 15 and delivers it to the evaporator 1. The blower 12 is operated by the control circuit 5 to revolve at a speed ranging from zero to maximum. The door 15 is also controlled by the control circuit 5 through an actuator 16.

The downstream end of the air conditioner has branch passages 17 and 18 which individually lead to upper and lower air outlets 17' and 18'. A mode door 19 is disposed in the branch conduit 17 and a mode door 20 in the branch conduit 18. The mode door 19 is controlled by the control circuit 5 through an actuator 22 and, likewise, the mode door 20 is controlled by the control circuit 5 through an actuator 23. The mode door 20 is movable between a first position where it blocks the passage 18, a second position where it directs air to a defrost outlet 21 and a third position where it passes air to the lower outlet 18'.

In a cooler mode, the door 19 will be opened and the door 20 closed. In a heater mode, the door 19 will be closed and the door 20 opened. In a bi-level mode, both of the doors 19 and 20 will be opened. Furthermore, in a defroser mode, the door 19 will be closed and the door 20 will assume the second position for supplying air to the defrost outlet 21.

In this way, the operation of the automotive air conditioner is controlled by output signals of the control circuit 5. Usually, the control circuit 5 selects an operating mode of the air conditioner, determines the amount of inlet air flowing through the system and permits the entry of recirculated or outside air in response to signals fed thereto from a mode selecting, unit 25 operatively connected with a mode lever, an inlet air amount control unit 26 and recirculated/outside air selector switch 28.

Figure 2:
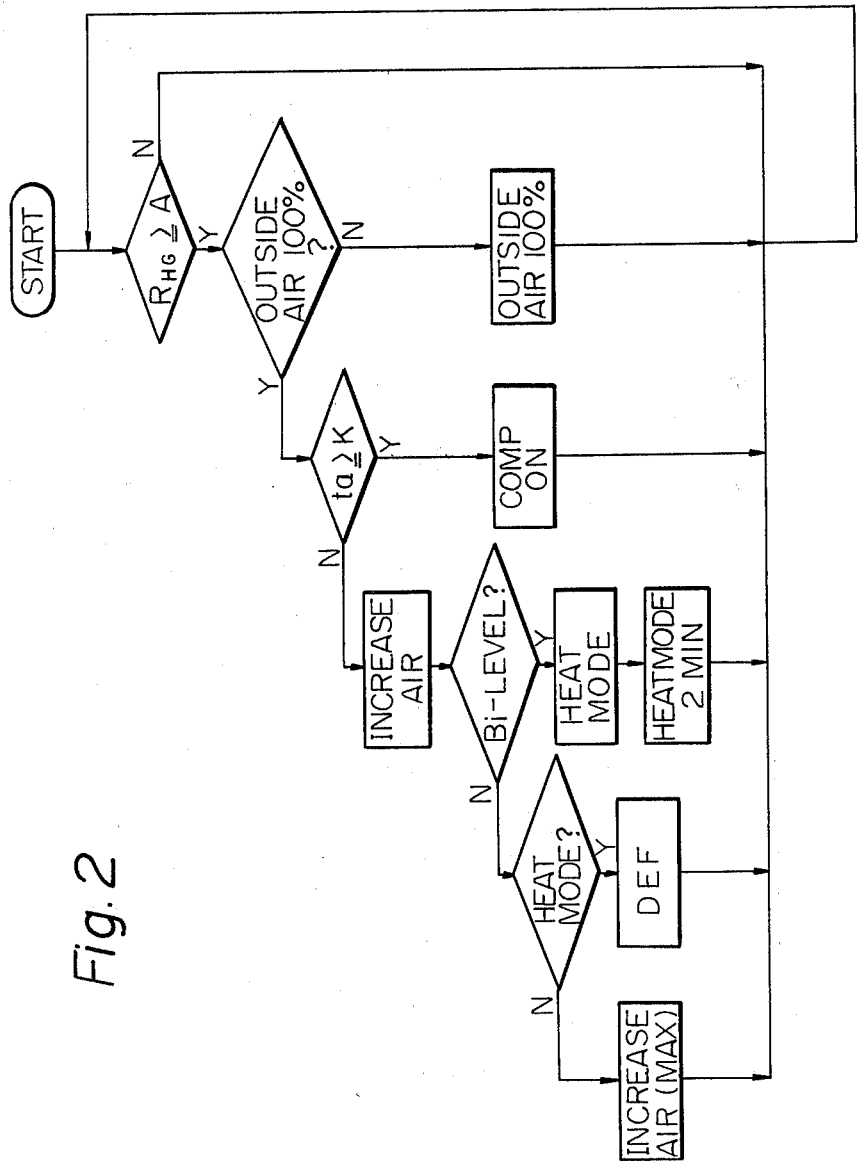
FIG. 2 is a flow chart demonstrating the operation of a control circuit associated with the air conditioner.

As an additional function, the control circuit 5 prevents fogging or dimming of windowpanes by driving the compressor 3, varying the operating speed of the blower 12, shifting the selector door 15 and/or shifting the mode doors 19 and 20 in accordance with various conditions as will be described below. For this purpose the control circuit 5 also receives output signals of an outside air temperature sensor 24 and a humidity sensor 27 responsive to fogging of inner surfaces of windowpanes. Automatic fogging prevention will occur according to a flow chart shown in FIG. 2.

Let it now be assumed that an output level $R_{HG}$ of the fogging sensor 27 higher than a given upper limit value A (on the order of 90% in terms of humidity for example) suggests the possibility of inner glass surfaces becoming fogged. Where the output level $R_{HG}$ of the sensor 27 remains below the upper limit value A under a certain operating condition of the air conditioner, there is no possibility of fogging of the windowpanes and no preventive measures will be taken. As the sensor output $R_{HG}$ becomes equal to or higher than the upper limit A, it is determined whether the incoming air is 100% outside air. If not, the control circuit 5 shifts the selector door 15 until a 100% proportion of outside air is reached. If so, the control circuit 5 checks whether the temperature $t_a$ of the outside air is equal to or higher than a temperature K at which the evaporator 1 is capable of dehumidification (e.g. 5° C.). If so, the compressor 3 is activated to dehumidify the incoming air. If not, the dehumidifying operation cannot be performed and, therefore, fogging of windowpanes must be avoided by increasing the amount of the inlet air to lower the absolute humidity in the passenger compartment and increasing the amount of defrosting air for the windshield. For this purpose, the control circuit 5 first actuates the blower 12 to increase the amount of inlet air and then checks whether the operating mode is a bi-level mode. If the bi-level mode, a heater mode is established instead for two minutes. If not the bi-level mode, the control circuit 5 determines whether the operating mode is a heater mode and, if so, switches the operating mode from the heater mode to a defrosting mode. A mode other than those mentioned must be a defrosting mode whether the outside temperature $t_a$ is lower than the dehumidifiable level K. The amount of air will be further increased up to the maximum. A practical example of the control circuit 5 is shown in FIG. 3.

Figure 3:
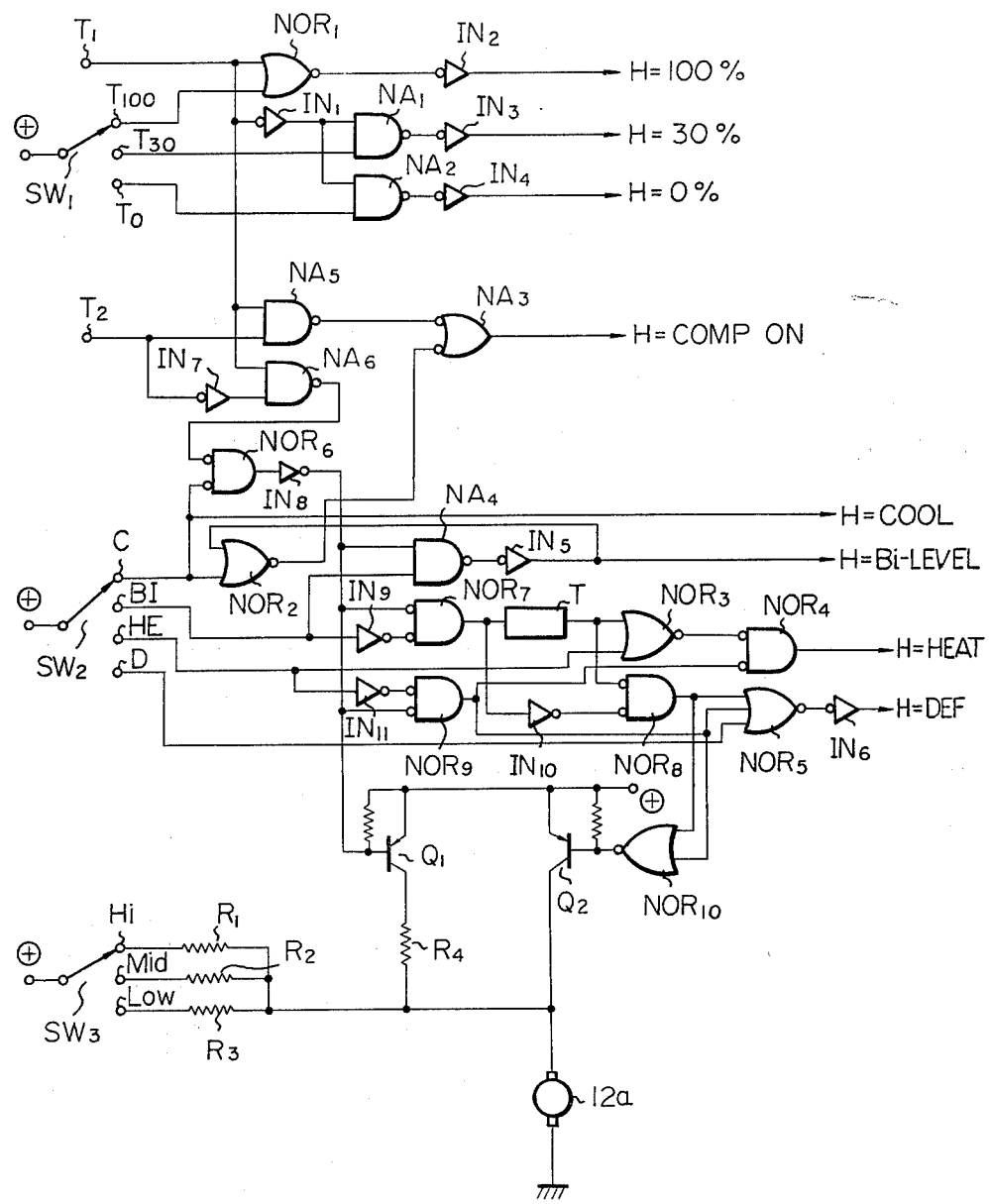
FIG. 3 is a circuit diagram of the control circuit.

Referring to FIG. 3, an output signal of the sensor 27 is applied to a terminal $T_1$ of the control circuit 5. When the signal level $R_{HG}$ is lower than the upper limit A, the input level at the terminal $T_1$ is low or "L" so that the output level of an inverter $IN_1$ is high or "H".

A switch $SW_1$ is shiftable to three different positions corresponding to amounts of outside air of 100%, 30% and 0%, respectively. When the switch $SW_1$ is in a first position $T_{100}$ which introduces 100% outside air, a NOR gate $NOR_1$ produces an "L" output causing an "H" output to appear from an inverter $IN_2$. When the switch $SW_1$ is in a second position $T_{30}$ providing 30% outside air, a NAND gate $NA_1$ produces an "L" output so that an "H" output appears from an inverter $IN_3$. In a third switch position $T_0$ providing 0% outside air, a NAND gate $NA_2$ is "L" in its output level and an inverter $IN_4$ is "H". Depending on the inverter $IN_2$, $IN_3$ or $IN_4$ whose output level is "H", the actuator 16 moves the selector door 15 to a predetermined position in which the proportion of outside air is 100%, 30% or 0%. As the signal level $R_{HG}$ becomes equal to or higher than the reference level A, the signal level at the terminal $T_1$ becomes "H" so that the output level of the NOR gate $NOR_1$ is made "L", that of the inverter $IN_2$ "H" and that of the inverter $IN_1$ "L". Under this condition, 100% outside air will be introduced in the air conditioner regardless of the position of the switch $SW_1$.

A second switch $SW_2$ is a mode selector switch constituting the mode selector 25 already mentioned. When this switch $SW_2$ is in a cooler mode position C, its output signal causes the actuators 22 and 23 to shift the corresponding mode doors 19 and 20 to their cooler mode positions. Simultaneously, it makes the output level of a NOR gate $NOR_2$ "L" and that of a NAND gate $NA_3$ "H" whereby the clutch 4 is coupled to drive the compressor 3 and in this way the evaporator 1. In a bi-level mode position BI of the switch $SW_2$, a NAND gate $NA_4$ produces an "L" output and an inverter $IN_5$ an "H" output. The actuators 22 and 23 this time move the associated doors 19 and 20 to their bi-level mode positions while the output level of the NOR gate $NOR_2$ becomes "L" and that of the NAND gate $NA_3$ "H" rendering the evaporator 1 operative. In a heater mode position HE of the switch $SW_2$, the output level of a NOR gate $NOR_3$ is "L" and that of a NOR gate $NOR_4$ "H" so that the actuators 22 and 23 move the corresponding mode doors 19 and 20 to their heater mode positions. Furthermore, in a defrosting mode position D of the switch $SW_2$, a NOR gate $NOR_5$ provides an "L" output and an inverter $IN_6$ an "H" output allowing the actuators 22 and 23 to move the individual mode doors 19 and 20 to defrosting mode positions.

A third switch $SW_3$ serves as the air amount adjusting unit 26. The switch $SW_3$ has three different positions Hi, Mid and Low in which a motor 12a for driving the blower 12 will rotate at a high speed, medium speed and low speed determined by individual resistors $R_1$–$R_3$.

The outside air temperature sensor 24 feeds its output to a terminal $T_2$ whose signal level will become "H" when the outside air temperature $t_a$ is equal to or higher than the reference level K. Suppose that the temperature $t_a$ is equal to or higher than K and the dimming sensor output $R_{HG}$ is equal to or higher than the upper limit A. Then the output level of a NAND gate $NA_5$ becomes "L" and that of the NAND gate $NA_3$ "H" driving the evaporator 1 for dehumidification. When the temperature $t_a$ drops lower than the reference level K and the dimming sensor output $R_{HG}$ equal to or larger than the upper limit A, the output of an inverter $IN_7$ becomes "H" and that of a NAND gate $NA_6$ "L". If in this instance the operating mode of the air conditioner is other than the cooler mode, a NOR gate $NOR_6$ produces an "H" output and an inverter $IN_8$ an "L" output whereby a transistor $Q_1$ is turned on to cause the motor 12a to rotate at a speed determined by a resistor $R_4$ thereby increasing the amount of air blown into the passenger compartment. If the operating mode is a bi-level mode, an inverter $IN_9$ becomes "L" in level and a NOR gate $NOR_7$ "H" so that a timer T produces an "H" output for 2 minutes. For this time period, the NOR gates $NOR_3$ and $NOR_4$ keep on producing "L" and "H" outputs to operate the air conditioner in a heater mode. When the output level of an inverter $IN_9$ becomes "L" and, after two minutes, the output level of the timer T "L", a NOR gate $NOR_8$ produces an "H" output making the output level of the NOR gate $NOR_5$ "L". This causes the inverter $IN_6$ to produce an "H" output which establishes a defrosting mode. At the same time, a NOR gate $NOR_{10}$ produces an "L" output to turn on a transistor $Q_2$ whereby the motor $12a$ is driven at the maximum speed which provides the maximum amount of air. If the operating mode of the air conditioner is a heater mode, an inverter $IN_{11}$ feeds its "L" output to the NOR gate $NOR_9$ so that the output of the NOR gate $NOR_9$ becomes "H", that of the NOR gate $NOR_5$ "L" and that of the inverter $IN_6$ "H" setting up a defrosting mode. At the same time, the output of the NOR gate $NOR_{10}$ becomes "L" to turn on the transistor $Q_2$ and thereby cause the motor $12a$ to rotate at the maximum speed for supplying the maximum amount of air.

As has been described, the anti-fogging system operates automatically in accordance with output signals of the humidity sensor 27 and outside air temperature sensor 24 to prevent the windshield and other windowpanes of a vehicle from fogging. This makes a marked contribution of safe driving.

If desired, the output of the NOR gate $NOR_8$ may be applied to the base of the transistor $Q_2$. The sensor 27 may be of the type responsive to dewing or fogging on the inner glass surfaces, humidity, humidity on the inner glass surfaces, absolute humidity inside the vehicle cabin, etc.

Figure 4:
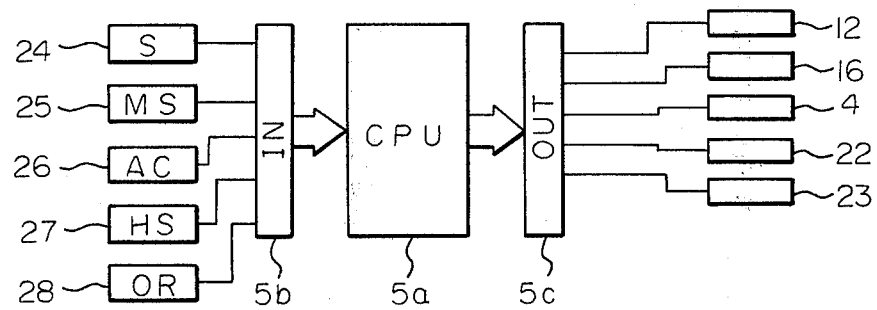
FIG. 4 is a block diagram representing a microcomputer of which the control circuit may consist.

As shown in FIG. 4, the control circuit 5 may comprise a microcomputer made up of a microprocessor $5a$, input unit $5b$ and output unit $5c$. In this case, the operating flow discussed above will be stored in the microprocessor $5a$ and a predetermined processing will be performed according to input information to activate selected units on the basis of the flow stored in the microprocessor.

In summary, the present invention facilitates automatic prevention of fogging on the inner surfaces of windows which frees the operator of a motor vehicle from troublesome and intricate manual work conventionally experienced and thereby promotes safe driving of the motor vehicle.

Various modifications will become possible for those skilled in the art after receiving the teachings of the present disclosure without departing from the scope thereof.

What is claimed is:

1. A vehicle interior humidity control apparatus including window inner surface humidity sensor means for sensing a window inner surface humidity and interior air control means, characterized by comprising:
   system control means responsive to the humidity sensor means for controlling the air control means in such a manner that when the humidity rises above a predetermined humidity value the air control means increases a proportion of outside air in inlet air to a maximum value;
   the air control means further comprising cooling means, the apparatus further comprising air temperature sensor means for sensing an outside air temperature, the system control means being responsive to the temperature sensor means for controlling the air control means in such a manner that when the proportion of outside air is at the maximum value, the humidity is above the predetermined humidity value and the air temperature is above the predetermined temperature value, the cooling means is energized; and when the air temperature is below the predetermined temperature value the air control means increases an amount of inlet air.

2. An apparatus as in claim 1, in which the air control means is operative in a cooling mode, a bi-level mode and a heating mode, the system control means controlling the air control means in such a manner that when the proportion of outside air is at the maximum value, the humidity is above the predetermined humidity value, the air temperature is below the predetermined temperature value and the air control means is in the bi-level mode, the air control means is switched to the heating mode for a predetermined length of time.

3. An apparatus as in claim 2, further comprising defroster means, the air control means being further operative in a defroster mode, the system control means controlling the air control means in such a manner that when the proportion of outside air is at the maximum value, the humidity is above the predetermined humidity value, the air temperature is below the predetermined temperature value and the air control means is in the heating mode, the air control means is switched to the defroster mode.

4. An apparatus as in claim 3, in which the system control means controls the air control means in such a manner that when the proportion of outside air is at the maximum value, the humidity is above the predetermined humidity value and the air control means is in the defroster mode, the amount of inlet air is increased to a maximum value.

5. An apparatus as in claim 1, in which the maximum proportion of outside air is 100%.

* * * * *